(12) United States Patent
Hecht et al.

(10) Patent No.: US 8,316,547 B2
(45) Date of Patent: Nov. 27, 2012

(54) PROTECTION DEVICE FOR A HAND-HELD POWER TOOL

(75) Inventors: Joachim Hecht, Magstadt (DE); Martin Kraus, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 12/296,174
(22) PCT Filed: Oct. 16, 2007
(86) PCT No.: PCT/EP2007/061026
§ 371 (c)(1),
(2), (4) Date: Oct. 6, 2008
(87) PCT Pub. No.: WO2008/071483
PCT Pub. Date: Jun. 19, 2008

(65) Prior Publication Data
US 2009/0277020 A1    Nov. 12, 2009

(30) Foreign Application Priority Data
Dec. 12, 2006 (DE) .......................... 10 2006 058 749

(51) Int. Cl.
B27B 19/09    (2006.01)
(52) U.S. Cl. ..................................... 30/166.3
(58) Field of Classification Search ............... 83/DIG. 1, 83/58, 62, 62.1, 72, 76.7, 788, 581, 471.2, 83/477.1, 477.2, 522.12, 526, 397.1, 522.121; 144/154.5, 356, 384, 391, 427, 286.5; 29/708, 29/254, 413; 324/550, 424; 408/5; 56/10.9, 56/11.3; 192/192 A, 129 R, 130; 102/202.7; 89/1.56; 137/68.12, 72, 76; 188/5, 6, 110, 188/189; 74/2; 403/2, 28; 411/2, 39, 390; 335/1, 242, 132; 318/362; 241/32.5; 337/239, 337/148, 1, 5, 10, 17, 140, 170, 190, 237, 337/401, 290, 404, 405; 218/2, 154; 307/639, 307/328, 115, 326, 142, 117, 126, 131; 451/409; 280/806; 297/480; 187/69, 77, 89, 189, 187/216, 166, 72.3; 30/392–394, 208–210, 30/166.3

See application file for complete search history.

(56) References Cited

U.S. PATENT DOCUMENTS
3,785,230 A * 1/1974 Lokey .............................. 30/388
(Continued)

FOREIGN PATENT DOCUMENTS
DE    91 09 573    12/1991
(Continued)

OTHER PUBLICATIONS
Erin F. Eppard, Operator Injury Mitigation Using Electronic Sensing and Mechanical Braking and Decoupling Devices in Handheld Circular Saws.*
(Continued)

Primary Examiner — Jason Daniel Prone
(74) Attorney, Agent, or Firm — Michael J. Striker

(57) ABSTRACT

A hand-held power tool protective device (10a-d) for a hand-held power tool (12a-d) with a drive unit and a tool (26a-d) includes an operating element (14a-d, 16a-d) which can actuate an electrical switch for activating the drive unit and a shut-off unit (18a-d) have a shut-off mechanism (24a-d). The shut-off unit (18a-d) brings about a shut-off during a deactivation of the operating element (14a-d, 16a-d) and therefore, a deactivation of the drive unit via the at least one shut-off means (24a-d). An emergency shut-off unit (28a-d) enables an emergency shut-off of an operation of the tool (26a-d) when the operating element (14a-d, 16a-d) is activated. The shut-off unit (18a-d) and the emergency shut-off unit (28a-d) are at least partially formed integrally.

15 Claims, 4 Drawing Sheets

U.S. PATENT DOCUMENTS

| | | | | |
|---|---|---|---|---|
| 3,858,095 A | * | 12/1974 | Friemann et al. | 192/129 A |
| 3,953,770 A | * | 4/1976 | Hayashi | 340/573.1 |
| 4,026,177 A | * | 5/1977 | Lokey | 83/DIG. 1 |
| 4,048,886 A | * | 9/1977 | Zettler | 83/58 |
| 4,117,752 A | * | 10/1978 | Yoneda | 83/58 |
| 4,653,189 A | * | 3/1987 | Andreasson | 30/382 |
| 5,081,406 A | * | 1/1992 | Hughes et al. | 318/478 |
| 5,942,975 A | * | 8/1999 | Sørensen | 318/478 |
| 6,889,585 B1 | * | 5/2005 | Harris et al. | 83/62 |
| 7,055,417 B1 | * | 6/2006 | Gass | 83/58 |
| 7,231,856 B2 | * | 6/2007 | Gass et al. | 83/58 |
| 7,373,863 B2 | * | 5/2008 | O'Banion et al. | 83/63 |
| 7,644,645 B2 | * | 1/2010 | Gass et al. | 83/62.1 |
| 7,827,889 B2 | * | 11/2010 | Carrier | 83/63 |
| 8,186,256 B2 | * | 5/2012 | Carrier | 83/63 |
| 2004/0103544 A1 | * | 6/2004 | Hartmann | 30/388 |

FOREIGN PATENT DOCUMENTS

| | | |
|---|---|---|
| DE | 10 2005 058 993 | 7/2006 |
| DE | 102006058749 A1 * | 6/2008 |
| EP | 1 131 994 | 9/2001 |
| WO | WO 01/26064 A2 * | 4/2001 |
| WO | WO 2008/071483 A1 * | 6/2008 |

OTHER PUBLICATIONS

SawStop, 2006.*

* cited by examiner

PROTECTION DEVICE FOR A HAND-HELD POWER TOOL

CROSS-REFERENCE

The invention described and claimed hereinbelow is also described in PCT/EP2007/061026, filed on Oct. 16, 2007 and DE 10 2006 058 749.9, filed on Dec. 12, 2006. This German Patent Application, whose subject matter is incorporated here by reference, provides the basis for a claim of priority of invention under 35 U.S.C. 119(a)-(d).

BACKGROUND OF THE INVENTION

The present invention is directed to a hand-held power tool protective device.

A hand-held power tool protective device with at least one operating element and a shut-off unit that brings about a shut-off using a shut-off means when the operating element is deactivated is already known.

SUMMARY OF THE INVENTION

The present invention is directed to a hand-held power tool protective device for a hand-held power tool, with at least one operating element and a shut-off unit, which brings about a shut-off using a shut-off means when the operating element is deactivated.

It is provided that the hand-held power tool protective device includes an emergency shut-off unit, which is provided for the emergency shut-off of an operation of the tool when the operating element is activated. As a result, a particularly advantageous protection mechanism inside the hand-held power tool protective device may be obtained, and, in particular, a risk of injury to an operator of the hand-held power tool may be advantageously prevented. A "shut off" is intended to mean, in particular, a shut-off of a drive unit of the hand-held power tool, e.g., an electric motor, and/or a shut-off and/or blocking of a tool. In particular, an at least partially automatic and, particularly advantageously, a fully automatic shut-off of a tool operation, e.g., an operation of a cutting tool designed as a knife, may be attained. An emergency shut-off of the cutting tool is preferably activated when the distance between the tool and a cable of the hand-held power tool—in particular a cable for supplying electrical current to the hand-held power tool—and/or between the tool and a body part of the operator and/or a further human or animal falls below a minimum level. An activation and/or deactivation of the operating element and/or several operating elements—e.g., on a hand-held power tool—which are/is provided for two-handed operation advantageously takes place via an operator of the hand-held power tool. In this context, the expression "activated operating element" refers, in particular, to an operating element that is actuated by an operator for an operation of the hand-held power tool. The hand-held power tool protective device is advantageously located inside a hand-held power tool designed as a hedge trimmer.

It is also provided that the shut-off unit and the emergency shut-off unit are designed at least partially as a single piece, thereby making it advantageously possible to eliminate further components, installation space, installation effort, and costs. Particularly advantageously, this may be attained when at least one mechanical shut-off means of the shut-off unit is designed as a single piece with the emergency shut-off unit. The shut-off means may be designed as a blocking element for blocking a motion of the tool, and/or by other components that appear reasonable to one skilled in the technical art.

It is also provided that the emergency shut-off unit includes an electromechanical unit, which is provided to convert an electrical signal into a mechanical motion, thereby advantageously making it possible to generate a mechanical shut-off mechanism within the hand-held power tool protective device. The electromechanical unit preferably receives the electrical signal from a sensor unit and/or an evaluation unit that evaluates the data and/or signals of the sensor unit.

A mechanical shut-off mechanism may be generated in a particularly advantageous manner with a simple design when the electromechanical unit includes an electromagnet. In this context, an electromagnet refers, in particular, to a coil through which electrical current may flow, and which is advantageously provided with a magnetic—in particular ferromagnetic—core element, and, when electrical current flows through the coil, a force acts on the magnetic core element that brings about a motion of the magnetic core element. In addition to an electromagnet, other units and/or components that appear reasonable to one skilled in the technical art for generating a mechanical motion in the presence of an electrical signal are also basically possible at any time.

A particularly advantageous transmission of force within the hand-held power tool protective device may be attained when the electromechanical unit includes at least one lever means, which is movably located. Preferably, a force of the electromagnet is transferred to further units and/or components via the lever means.

When the electromechanical unit includes at least one spring means, which is provided to support the lever element against a hand-held power tool housing, a direction of motion of the lever means may be advantageously influenced and/or a speed of the lever mechanism may be advantageously increased when a force is transmitted. The spring means of the electromechanical unit may be located on the hand-held power tool housing directly or indirectly via further components.

In a further embodiment of the present invention, it is provided that the emergency shut-off unit includes a connecting unit, which is provided to hold the switch means in a switch position for an emergency shut-off. As a result, an emergency shut-off of the hand-held power tool and/or the hand-held power tool protective device may be realized particularly rapidly and, therefore, effective protection for an operator of the hand-held power tool may be attained.

It is furthermore provided that the connecting unit includes at least one connecting means, which, in at least one operating position, interrupts an operative connection of the shut-off means with at least one operating element, thereby making it possible to attain an emergency shut-off of the tool of the hand-held power tool using the shut-off means when an operating element has been activated by an operator. The connecting means may be coupled to the shut-off means directly or indirectly via further components such as a shut-off facilitation means. The connecting means are preferably movably located on the shut-off means and/or the further component, thereby making it possible to realize an emergency shut-off using a simple design via the action of a force and/or a moment—in particular a tilting moment—on the connecting means.

It is furthermore provided that the connecting unit includes at least one limiting means, which, in at least one operating position, limits a motion of the connecting means, thereby making it possible to attain an accidental shut-off of the hand-held power tool and/or a blocking of the cutting tool during operation of the hand-held power tool. In addition, a triggering of the emergency shut-off may be limited to a period of time and/or a point in time when an operator is at risk, e.g., due to imminent contact between the operator and/or a cable of the hand-held power tool and the cutting tool.

In an advantageous refinement of the present invention, it is provided that the limiting means are movably located between the connecting means of the connecting unit and the lever means of the electromechanical unit. As a result, a transmission of a shut-off pulse—in particular an emergency shut-off pulse—from the electromechanical unit—in particular the lever means—to the connecting unit may be attained using a simple design.

It is furthermore provided that the connecting unit includes at least one positioning means, which is provided to activate the connecting unit after an emergency shut-off, thereby making it possible to bring the hand-held power tool protective device into an advantageous starting position for renewed operation, with a possible emergency shut-off off the hand-held power tool. An "activatable switch position" refers to a switch position of the hand-held power tool in which an operation of the hand-held power tool is attained via an activation or actuation of an operating element.

It is also provided that a deactivation of at least one of the operating elements results in an activatable switch position of the emergency shut-off unit, thereby making it possible to attain a particularly advantageous safeguard for the hand-held power tool and/or the hand-held power tool protective device, given that an operator needs to actuate at least one of the operating elements before operation of the hand-held power tool may be restarted. As a result, it is possible to advantageously prevent the hand-held power tool from becoming switched on accidentally or when an operator does not desire it to become switched on.

BRIEF DESCRIPTION OF THE DRAWINGS

Further advantages result from the description of the drawing, below. Exemplary embodiments of the present invention are shown in the drawing. The drawing, the description, and the claims contain numerous features in combination. One skilled in the art will also advantageously consider the features individually and combine them to form further reasonable combinations.

DETAILED DESCRIPTION OF THE EXEMPLARY EMBODIMENTS

Figure 1:
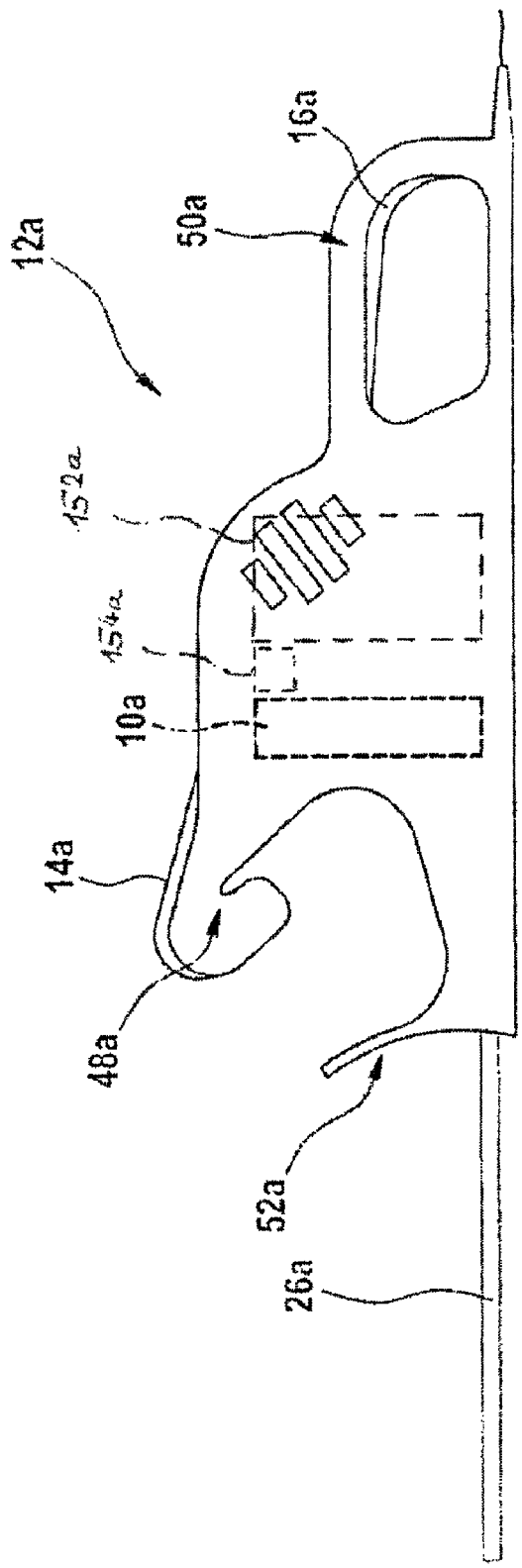
FIG. 1 shows a hand-held power tool with an inventive hand-held power tool protective device.

FIG. 1 shows a hand-held power tool 12a designed as a hedge trimmer, with an inventive hand-held power tool protective device 10a. Hand-held power tool 12a includes two grip regions 48a, 50a, each of which includes an operating element 14a, 16a. Grip regions 48a, 50a are provided for two-handed guidance of hand-held power tool 12a by an operator. In addition, hand-held power tool 12a includes, in a front region 52a, a tool 26a designed as a cutting tool, in particular a scissors tool.

Hand-held power tool protective device 10a(FIGS. 2 and 3) includes a shut-off unit 18a and an emergency shut-off unit 28a. Shut-off unit 18a is provided to shut off a drive unit 152a and/or to block tool 26a as soon as an operator deactivates one of the two operating elements 14a, 16a. To this end, shut-off unit 18a includes two shut-off facilitation means 20a, 22a, each of which is operatively connected with one of the operating elements 14a, 16a, so that an activation or actuation of one of the operating elements 14a, 16a brings about a motion in direction 74a of a main extension direction 54a of particular shut-off facilitation means 20a, 22a. Shut-off facilitation means 20a have a two-pieced design. Shut-off unit 18a also includes a shut-off means 24a designed as a brake pin, which is located between the two shut-off facilitation means 20a, 22a and parallel to their main extension direction 54a. A sliding sleeve 56a is located around pin-type shut-off means 24a, which is supported such that it is movable in a main extension direction 58a of shut-off means 24a. A gear 60a is located on sliding sleeve 56a, which engages on both sides with corresponding toothing 62a, 64a of one of the two shut-off facilitation means 20a, 22a. Toothing 62a, 64a is located on a side of shut-off facilitation means 20a, 22a facing shut-off means 24a. Shut-off means 24a are supported at one end 66a via a spring element 68a against a hand-held power tool housing 38a, which includes a guide means 70a designed as a recess in which shut-off means 24a are movably supported perpendicularly to a main extension direction 72a of hand-held power tool housing 38a.

During operation of hand-held power tool 12a, when the two operating elements 14a, 16a are activated or actuated, a force is exerted on shut-off facilitation means 20a, 22a in direction 74a, and the two shut-off facilitation means 20a, 22a —together with sliding sleeve 56a and gear 60a—are pressed against a spring force of spring element 68a. Shut-off means 24a are also moved in direction 74a against the spring force and against an electrical switch 154a to actuate a drive unit of hand-held power tool 12a. To shut off hand-held power tool 12a, it is sufficient to deactivate one of the two operating elements 14a, 16a, and related shut-off facilitating means 20a, 22a are moved, together with shut-off means 24a and gear 60a, against direction 74a due to the spring force of spring element 68a. Contact of shut-off means 24a with the electric switch is thereby interrupted, and shut-off means 24a blocks —via one end that is directed against spring element 68a—a motion of the cutting tool.

Figure 2:
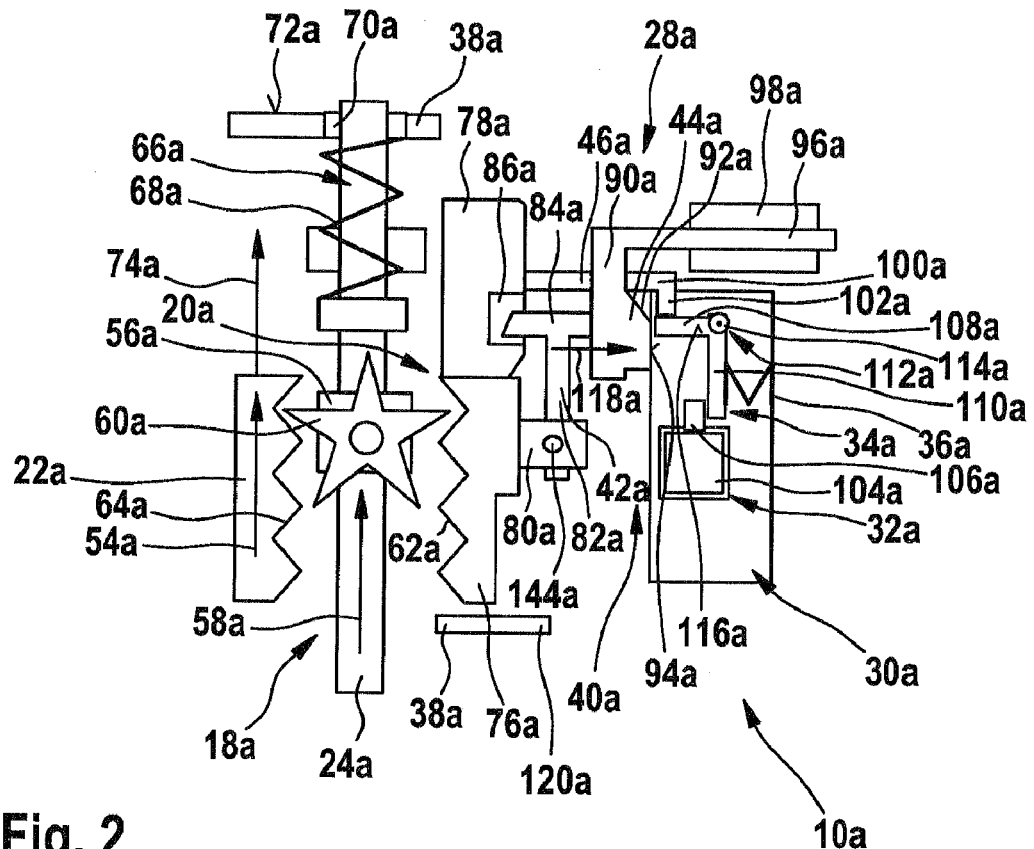
FIG. 2 shows the hand-held power tool protective device in FIG. 1, in a schematic depiction.
Figure 3:
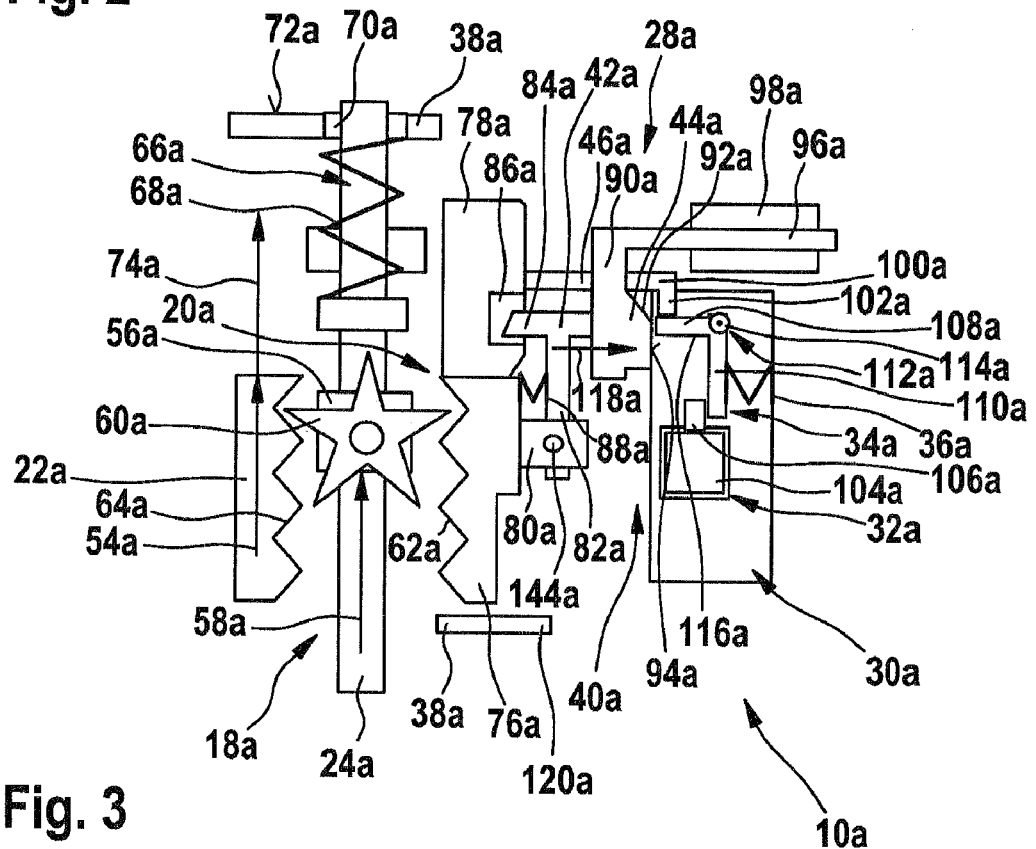
FIG. 3 shows the hand-held power tool protective device in FIG. 2, with an additional spring element, in a schematic depiction.

Emergency shut-off unit 28a is provided to allow an operator to shut off a drive unit of hand-held power tool 12a and/or to block tool 26a when operating elements 14a, 16a are activated (FIGS. 2 and 3). To this end, emergency shut-off unit 28a is designed partially as one piece with shut-off unit 18a and includes, in addition to shut-off means 24a and shut-off facilitating means 20a, an electromechanical unit 30a and a connecting unit 40a. Connecting unit 40a includes a connecting means 42a, a limiting means 44a, and a positioning means 46a. Connecting means 42a are T-shaped in design, and they are provided to establish an operative connection between components 76a, 78a of two-pieced shut-off facilitating means 20a. To this end, first component 76a includes a bearing element 80a for accommodating connecting means 42a, in which a peg-shaped connecting element 82a of connecting means 42a is rotatably supported. Bearing element 80a is located on a side of shut-off facilitating means 20a facing away from shut-off means 24a. A retaining element 84a is integrally formed with peg-shaped connecting element 82a on an end facing away from bearing element 80a, which engages in a recess 86a of second component 78a of shut-off facilitating means 20a. In addition, connecting means 42a and/or peg-shaped connecting element 82a may be supported via a spring element 88a against first component 76a of shut-off facilitating means 20a (FIG. 3), thereby enabling a shut-off speed of connecting means 42a to be advantageously increased. Similar to bearing element 80a of first component 76a, recess 86a is located on a side of shut-off facilitating means 20a facing away from shut-off means 24a. By actuating operating element 14a, shut-off facilitating means 20a are moved in direction 74a, and a force is exerted on connecting means 42a, which brings about a rotational motion around a rotational axis 144a of connecting means 42a oriented away from second component 78a of shut-off facilitating means 20a.

To hold connecting means 42a in a position such that it is engaged with recess 86a before an emergency shut-off, limiting means 44a are located on a side of retaining element 84a opposite to shut-off facilitating means 20a. Limiting means 44a are designed essentially in the shape of an L, and a limiting element 90a of limiting means 44a is oriented parallel to main extension direction 54a of shut-off facilitating means 20a. Limiting element 90a includes—on a side that faces away from retaining element 84a and that faces electromechanical unit 30a—a region with a guide bevel 92a and a supporting region 94a. Guide bevel 92a abuts supporting region 94a in direction 74a. Supporting region 94a has an enlarged cross section and forms a transition to a subregion of limiting element 90a with a smaller cross section. Perpendicular to limiting element 90a and/or to direction 74a, limiting means 44a include a guide element 96a that is guided in a guide means 98a of hand-held power tool housing 38a along guide means 98a and perpendicular to direction 74a. In addition, positioning means 46a are located on second component 78a of shut-off facilitating means 20a. Positioning means 46a extend perpendicularly to main extension direction 54a of shut-off facilitating means 20a on a side of shut-off facilitating means 20a facing away from shut-off means 24a, and extend away from shut-off facilitating means 20a. On an end 100a of positioning means 46a facing away from shut-off facilitating means 20a, positioning means 46a includes a perpendicular element 102a that extends in a direction of first component 76a of shut-off facilitating means 20a and/or in the direction of electromechanical unit 30a.

Electromechanical unit 30a is provided to convert an electrical signal from a sensor unit and/or an evaluation unit—which sense imminent contact between the cutting tool and the operator and/or a cable of hand-held power tool 12a—into a mechanical motion. To this end, electromechanical unit 30a includes an electromagnet 32a, which is designed as a coil 104a and a ferromagnetic core element 106a. Moreover, electromechanical unit 30a includes a lever means 34a and a spring means 36a; spring means 36a cause lever means 34a to bear against hand-held power tool housing 38a. Lever means 34a are composed of two legs 108a, 110a, which are oriented perpendicularly relative to each other in the shape of an L. A rotational axis 114a extends through one L-shaped edge region 112a, rotational axis 114a being oriented perpendicularly to a main extension surface 116a of lever means 34a. To prevent limiting means 44a from moving along guide means 98a in the direction of lever means 34a, leg 108a supports limiting means 44a at support region 94a. In an activated or activatable operating position of hand-held power tool protective device 10a, core element 106a extends out of coil 104a so far that core element 106a serves to limit the path of leg 110a, and a rotational motion of lever means 34a—that is induced by a spring force of preloaded spring means 36a—around rotational axis 114a is prevented.

During operation of hand-held power tool 12a, the two shut-off facilitating means 20a, 22a are located—together with shut-off means 24a—in an end position that is slid in direction 74a. When a shut-off signal is present, a change in the magnetic field is induced in coil 104a, which pulls core element 106a into coil 104a. When core element 106a enters coil 104a at least partially and leg 108a bears via spring means 36a against hand-held power tool housing 38a, a rotational motion of lever means 34a around rotational axis 114a—and, therefore, a motion inside connecting unit 40a—is induced. Via the force that acts on connecting means 42a during operation of hand-held power tool 12a, connecting means 42a are moved—together with limiting means 44a—in a direction 118a that extends in the direction of electromechanical unit 30a, as viewed from shut-off facilitating means 20a. Retaining element 84a therefore moves out of recess 86a, and an operative connection between first component 76a and second component 78a is interrupted. Shut-off means 24a therefore moves together with shut-off facilitating means 20a due to the spring force of spring element 68a in the direction of the spring force. Contact of shut-off means 24a with the electric switch is thereby interrupted, and shut-off means 24a blocks a motion of the cutting tool. First component 76a of shut-off facilitating means 20a is moved in the direction of the spring force until it reaches a stop means 120a of hand-held power tool housing 38a.

To bring hand-held power tool protective device 10a into an activatable switch position, it is necessary for the operator to deactivate operating element 14a. Second component 78a of shut-off facilitating means 20a then moves toward first component 76a, and positioning means 46a of connecting unit 40a presses on leg 108a of lever means 34a, which are moved back into a starting position. A rotation of lever means 34a therefore results in leg 108a of limiting means 44a moving—due to guide bevel 92a—in the direction of shut-off facilitating means 20a, thereby also moving connecting means 42a toward second component 78a of shut-off facilitating means 20a. Retaining element 84a re-engages in recess 86a of second component 78a, and emergency shut-off unit 28a is in an activatable switch position (FIGS. 2 and 3).

Alternative exemplary embodiments are shown in FIGS. 4 through 7. Components, features, and functions that are essentially the same are labelled with the same reference numerals. To distinguish the exemplary embodiments from each other, the reference numerals of the exemplary embodiments are appended with the letters a through d. The description below is essentially limited to the differences from the exemplary embodiment in FIGS. 1 through 3. With regard for the components, features, and functions that remain the same, reference is made to the description of the exemplary embodiment in FIGS. 1 through 3.

Figure 4:
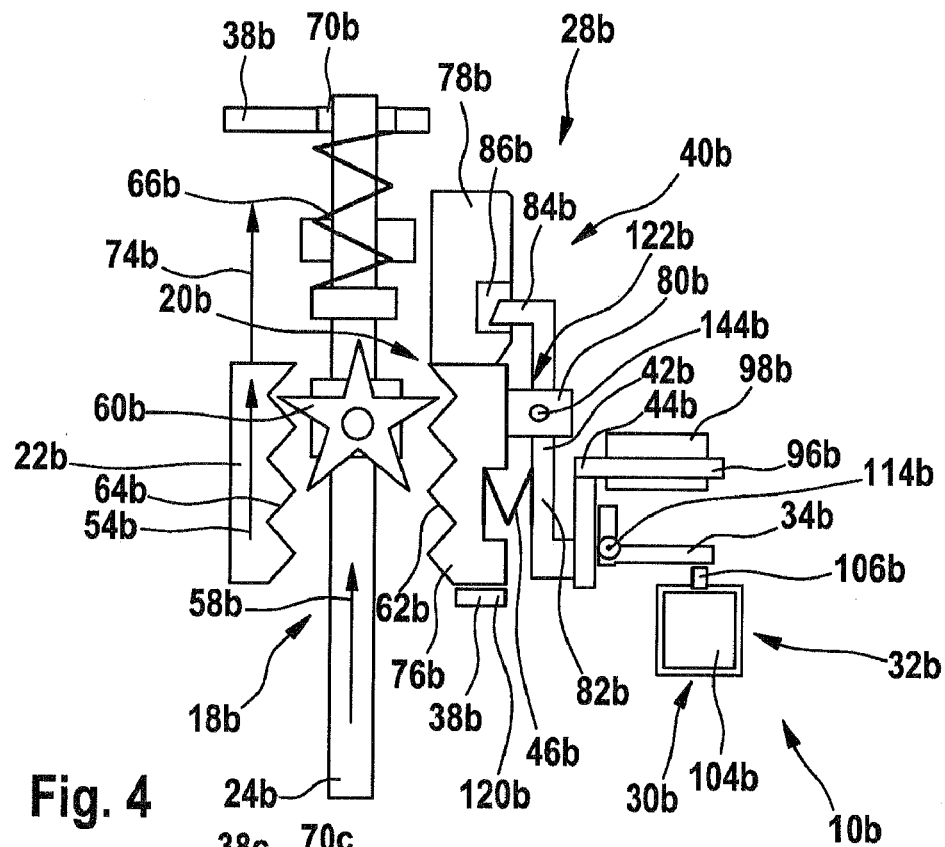
FIG. 4 shows a further hand-held power tool protective device, in a schematic depiction.

FIG. 4 shows a hand-held power tool protective device 10b in an activatable switch position with a connecting means 42b designed as a lever to amplify force. A central subregion 122b of connecting means 42b is rotatably supported in a bearing element 80b of first component 76b. In addition, connecting means 42b are supported via a positioning means 46b designed as a spring element against a first component 76b of a shut-off facilitating means 20b, and a connecting element 82b of connecting means 42b is supported along a direction 74b upstream of bearing element 80b. After an emergency shut-off of hand-held power tool protective device 10b, positioning means 46b return connecting means 42b to a starting position of a recess 86b of second component 78b for an activatable switch position.

When a shut-off signal is present, a change in a magnetic field is generated in a coil 104b of an electromagnet 32b, which exerts a force on a core element 106b that moves core element 106b out of coil 104b. When the shut-off signal is present, a lever means 34b performs a rotational motion, which moves a limiting means 44b and connecting means 42b in the direction of shut-off facilitating means 20b against a spring force of spring element 68b, thereby interrupting an operative connection of first component 76b with an operating element 14b. Due to a lever effect of connecting means 42b, during operation of a hand-held power tool 12b, a small change in length of lever means 34b together with limiting means 44b induces a triggering of an emergency shut-off. An emergency shut-off takes place only during operation of hand-held power tool 12b when both shut-off facilitating means 20b, 22b are located in an end position that has been slid in direction 74b.

Figure 5:
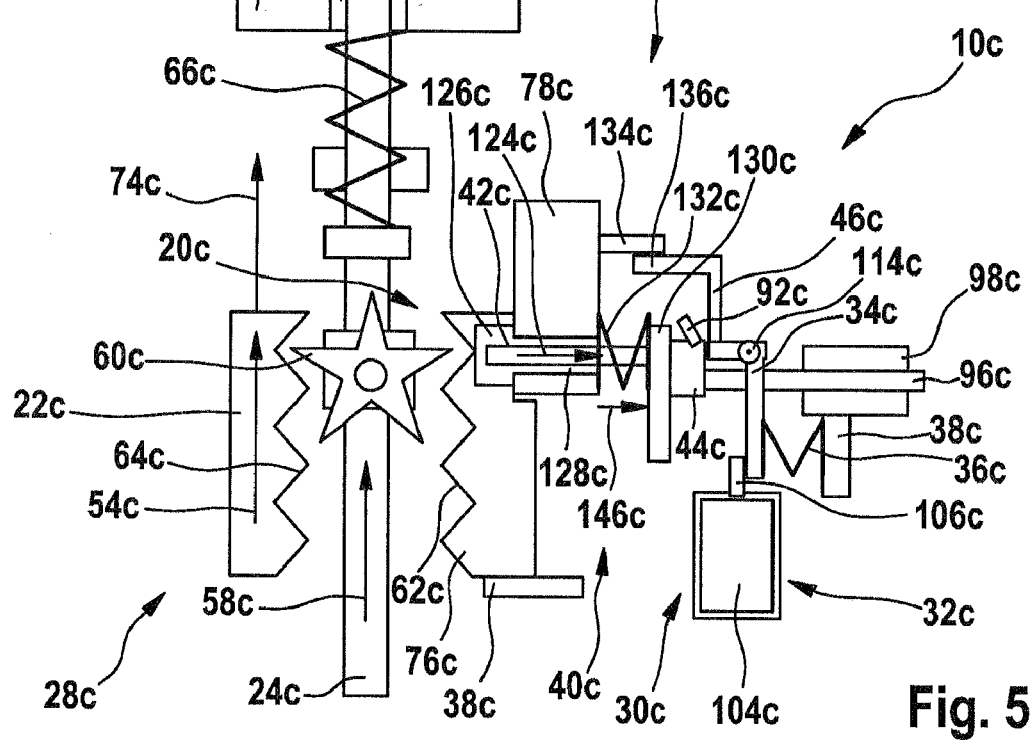
FIG. 5 shows a further hand-held power tool protective device, in a schematic depiction.
Figure 6:
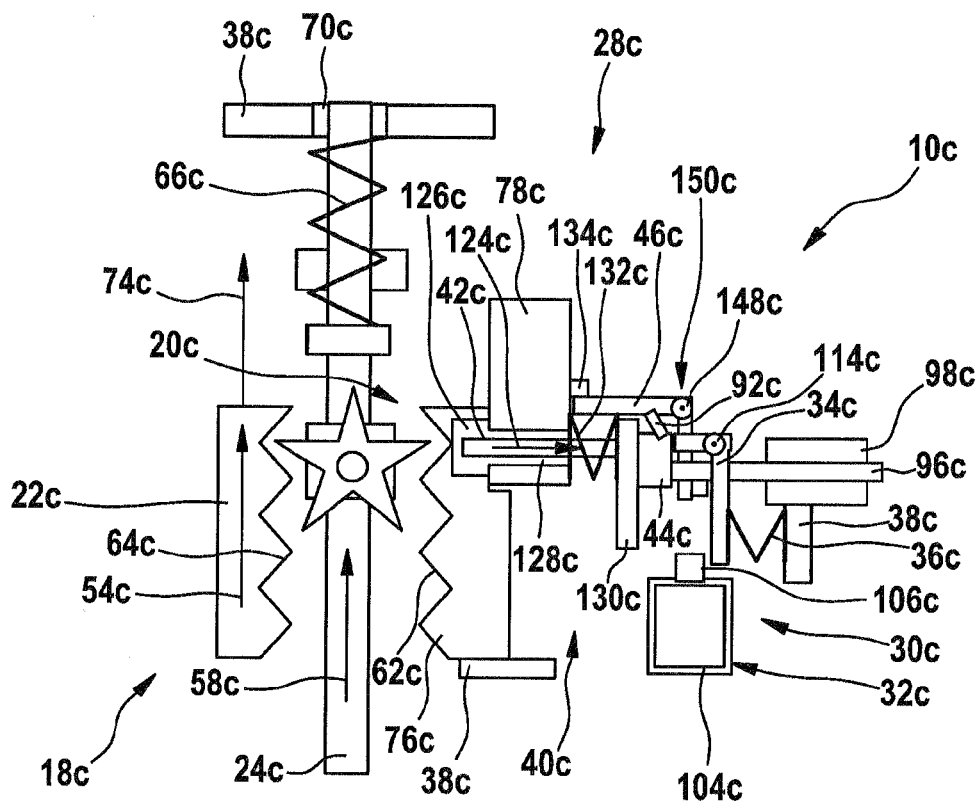
FIG. 6 shows a hand-held power tool protective device that is an alternative to that shown in FIG. 5, in a schematic depiction.

FIGS. 5 and 6 show a hand-held power tool protective device 10c with a pin-shaped connecting means 42c, whose main extension direction 124c is oriented perpendicularly to a main extension direction 54c of shut-off facilitating means 20c. To this end, a first component 76c and a second component 78c of shut-off facilitating means 20c are located partially next to each other along their main extension directions 54c. First component 76c includes a recess 126c for accommodating connecting means 42c, and second component 78c includes a recess 128c, which extends perpendicularly to main extension direction 54c, and through which connecting means 42c engage in recess 126c of first component 76c. A support element 130c is located on connecting means 42c as a single piece therewith and perpendicularly thereto. Bearing element 130c bears via a spring element 132c against second component 78c of shut-off facilitating means 20c. Given a shut-off mechanism of an emergency shut-off unit 28c, spring element 132c results in connecting means 42c moving out of recess 126c of first component 76c in the direction of a spring force 146c, and an operative connection between first component 76c with an operating element 14c is interrupted.

In addition, a positioning means 46c of a connecting unit 40c having an L-shaped design is designed as a single piece with a lever means 34c of an electromechanical unit 30c. A force on positioning means 46c and, therefore, on lever means 34c that results in an activatable switch position within emergency shut-off unit 28c is exerted via a peg-shaped element 134c located on second component 78c of shut-off facilitating means 20c perpendicular to a main extension direction 54c. When operating element 14c is deactivated and, therefore, second component 78c moves, peg-shaped element 134c moves against a direction 74c and toward a subregion 136c of positioning means 46c facing shut-off facilitating means 20c and exerts pressure on it. Positioning means 46c transfers this pressure and/or the force to lever means 34c and returns them—together with a limiting means 44c—to a starting position.

In FIG. 6, in addition to the exemplary embodiment in FIG. 5, L-shaped positioning means 46c of connecting unit 40c are rotatably supported. A rotation axis 148c extends through an L-shaped edge region 150c of positioning means 46c. Positioning means 46c rotate around rotation axis 114c due to a rotation of lever means 34c.

Figure 7:
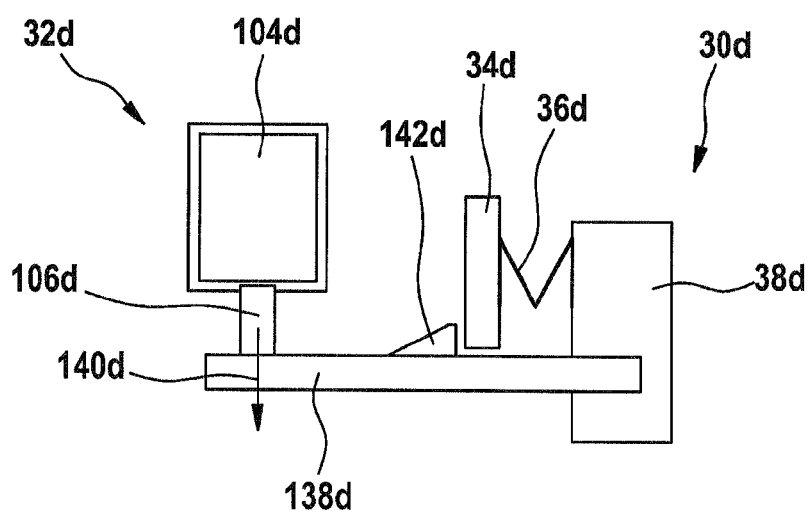
FIG. 7 shows an alternative electromechanical unit of the hand-held power tool protective device, in a schematic depiction.

FIG. 7 shows a subregion of an electromechanical unit 30d of a hand-held power tool protective device 10d. When a shut-off signal is present, a change in a magnetic field is generated in a coil 104d of an electromagnet 32d, which exerts a force on a core element 106d that moves core element 106d out of coil 104d. When core element 106d is moved out of coil 104d, core element 106d is pressed against a spring element 138d, which bears against a hand-held power tool housing 38d perpendicularly to a moving direction 140d of core element 106d. A detent element 142d designed as a detent edge is integrally formed as a single piece with spring element 138d, downstream of a lever means 34d, as viewed from hand-held power tool housing 38d in the direction of electromagnet 32d. During an emergency shut-off, spring element 138d is loaded via core element 106d in moving direction 140d of core element 106d, and lever means 34d may trigger a mechanical shut-off mechanism due to the spring force of spring element 36d of electromechanical unit 30d. In addition, lever means 34d are held via the detent edge in an activated and/or activatable switch position of hand-held power tool protective device 10d. It is also basically feasible for spring element 138d to bear against hand-held power tool housing 38d, against moving direction 140d of core element 106d, when the shut-off signal is present, and/or for spring element 138d to be rotatably supported on hand-held power tool housing 38d.

What is claimed is:

1. A hand-held power tool comprising:
   at least one drive unit;
   a working part;
   an electrical switch;
   at least one operating element which can actuate the electrical switch for activating the drive unit; and
   a hand-held power tool protective device, wherein the hand-held power tool protective device includes a shut-off unit comprising at least one brake pin and at least one shut-off facilitation element wherein the at least one brake pin is movably connected to the at least one shut-off facilitation element connected to the at least one operating element, wherein the shut-off unit is configured to shut-off the at least one operating element upon deactivation of the at least one operating element, and therefore, a deactivation of the drive unit via the at least one brake pin, wherein the hand-held power tool protective device includes an emergency shut-off unit, which is provided for an emergency shut-off of an operation of the tool when the at least one operating element is activated,
   wherein the shut-off unit and the emergency shut-off unit are at least partially integral, wherein the at least one brake pin and the at least one shut-off facilitation element cooperate with the emergency shut-off unit, wherein the emergency shut-off unit comprises an electromechanical unit and a connecting unit, wherein the connecting unit includes at least one connecting element which engages in a recess of the at least one shut-off facilitation element to hold the at least one brake pin in a switch position for an emergency shut-off, and wherein the electromechanical unit is provided to allow a movement of the at least one connecting element out of the recess to allow a movement of the at least one shut-off facilitation element to move the at least one brake pin for braking the working part during an emergency shut-off.

2. The hand-held power tool as recited in claim 1, wherein the at least one brake pin of the shut-off unit is mechanical.

3. The hand-held power tool as recited in claim 1, wherein the electromechanical unit converts an electric signal from a sensor unit and/or evaluation unit, which senses imminent contact between the working part and an operator and/or a cable, into a mechanical motion.

4. The hand-held power tool as recited in claim 1, wherein the electromechanical unit includes an electromagnet.

5. The hand-held power tool as recited in claim 4, wherein the electromagnet includes a coil and a ferromagnetic core element.

6. The hand-held power tool as recited in claim 5, the ferromagnetic core element extends out of the coil and so prevents a motion of at least one lever element of the electromechanical unit.

7. The hand-held power tool as recited in claim 5, wherein a shut-off signal effects a change in magnetic field inducted in the coil, whereby the ferromagnetic core element is pulled into the coil.

8. The hand-held power tool as recited in claim 1, wherein the electromechanical unit includes at least one lever element, which is movably located.

9. The hand-held power tool as recited in claim 8, wherein the electromechanical unit includes at least one spring element, which is provided to support said at least one lever element on a hand-held power tool housing.

10. The hand-held power tool as recited in claim 1, wherein the connecting unit includes at least one limiting element, which limits a motion of the at least one connection element in at least one operating position.

11. The hand-held power tool as recited in claim 10, wherein the at least one limiting element is movably located between at least one means for connecting of the connecting unit and at least one lever element of the electromechanical unit.

12. The hand-held power tool as recited in claim 1, wherein the at least one operating element is configured to cause a motion in a direction of the at least one shut-off facilitation element when said at least one operating element is activated or actuated.

13. The hand-held power tool as recited in claim 1, wherein the at least one shut-off facilitation element has a two-pieced design.

14. The hand-held power tool as recited in claim 1, wherein the at least one shut-off facilitation element has at least one toothing which engages with a gear.

15. A hand-held power tool comprising:
at least one drive unit;
a working part;
an electrical switch;
at least one operating element which can actuate the electrical switch for activating the drive unit; and
a hand-held power tool protective device,
wherein the hand-held power tool protective device includes a shut-off unit comprising at least one shut-off element and at least one shut-off facilitation element, wherein the at least one shut-off element is movably connected to the at least one shut-off facilitation element connected to the at least one operating element, wherein the shut-off unit is configured to shut-off the at least one operating element upon deactivation of the at least one operating element, and therefore, a deactivation of the drive unit via the at least one shut-off element, and wherein an activation or actuation of the at least one operating element brings about a motion in a direction of the at least one shut-off facilitation element, and wherein the at least one shut-off facilitation element has a two-pieced design and has at least one toothing which engages with a gear, wherein the hand-held power tool protective device includes an emergency shut-off unit, which is provided for an emergency shut-off of an operation of the tool when the at least one operating element is activated,
wherein the at least one shut-off unit and the emergency shut-off unit are at least partially integral.

\* \* \* \* \*